(12) United States Patent
Colaianni et al.

(10) Patent No.: US 10,698,474 B2
(45) Date of Patent: Jun. 30, 2020

(54) APPARATUS AND METHOD FOR DESIGNING PATTERNS FOR WEARABLE ITEMS

(71) Applicant: adidas AG, Herzogenaurach (DE)

(72) Inventors: Matteo Colaianni, Herzogenaurach (DE); Jan Hill, Herzogenaurach (DE); Anna Wilhelmi, Herzogenaurach (DE); Jochen Björn Süßmuth, Herzogenaurach (DE); David Joseph Gareth O'Mahony, Herzogenaurach (DE)

(73) Assignee: adidas AG, Herzogenaurach (DE)

(*) Notice: Subject to any disclaimer, the term of this patent is extended or adjusted under 35 U.S.C. 154(b) by 0 days.

(21) Appl. No.: 15/611,631

(22) Filed: Jun. 1, 2017

(65) Prior Publication Data
US 2017/0351323 A1 Dec. 7, 2017

(30) Foreign Application Priority Data
Jun. 2, 2016 (DE) .................. 10 2016 209 671

(51) Int. Cl.
*G06F 3/01* (2006.01)
*G06K 9/00* (2006.01)
(Continued)

(52) U.S. Cl.
CPC ............ *G06F 3/011* (2013.01); *G06F 3/0325* (2013.01); *G06K 9/00362* (2013.01);
(Continued)

(58) Field of Classification Search
CPC ........ A41H 3/007; A41H 3/04; G06F 3/0325; G06F 3/011; G06F 2217/32;
(Continued)

(56) References Cited

U.S. PATENT DOCUMENTS 9,911,241 B2 * 3/2018 Piche .................... G06T 19/20
2005/0049741 A1 3/2005 Dias et al.
(Continued)

FOREIGN PATENT DOCUMENTS

CN 102044038 5/2011
EP 2775456 A2 9/2014
(Continued)

OTHER PUBLICATIONS

Anonymous, Panasonic Demo Booth CES 2016, available at https://www.youtube.com;watch?v=PoCr29NpV2U, at least as early as Jan. 7, 2016, 1 page (website screen shot submitted).
(Continued)

*Primary Examiner* — Patrick M Edouard
*Assistant Examiner* — Douglas M Wilson
(74) *Attorney, Agent, or Firm* — Kilpatrick Townsend & Stockton LLP (57) ABSTRACT

Described is an apparatus for designing a pattern for a wearable item, comprising: (a.) position detector adapted to detect a position of at least a portion of a body of a user; and (b.) data processor adapted to compute at least one intersection of at least one virtual object and the portion of the body of the user, and pattern data representative of a pattern for the wearable item based on the intersection. In addition, described is a method for designing a pattern for a wearable item.

30 Claims, 1 Drawing Sheet

(51) Int. Cl.
*G06T 19/00* (2011.01)
*G06T 7/73* (2017.01)
*G06F 3/03* (2006.01)
*G06T 19/20* (2011.01)
*G06T 13/40* (2011.01)
*G06Q 30/06* (2012.01)
*A41H 3/00* (2006.01)

(52) U.S. Cl.
CPC ............ *G06K 9/00671* (2013.01); *G06T 7/74* (2017.01); *G06T 19/00* (2013.01); *G06T 19/006* (2013.01); *G06T 19/20* (2013.01); *A41H 3/007* (2013.01); *G06Q 30/0643* (2013.01); *G06T 13/40* (2013.01); *G06T 2210/21* (2013.01); *G06T 2219/2012* (2013.01)

(58) Field of Classification Search
CPC ............ G06K 9/00362; G06K 9/00671; G06T 19/00; G06T 10/006; G06T 2219/2012; G06T 13/40; G06T 19/20; G06T 2210/21; G06T 2210/32; G06T 2210/16; G06T 2219/008; G06T 7/75; G06Q 30/0643
See application file for complete search history.

(56) References Cited

U.S. PATENT DOCUMENTS

| | | | | |
|---|---|---|---|---|
| 2009/0099683 | A1* | 4/2009 | Lastra | G06F 30/00 700/132 |
| 2013/0083018 | A1* | 4/2013 | Geisner | G06F 3/011 345/420 |
| 2014/0249961 | A1* | 9/2014 | Zagel | G06K 9/00369 705/26.61 |
| 2015/0208746 | A1* | 7/2015 | Schindler | G06Q 10/06 700/132 |
| 2016/0093111 | A1* | 3/2016 | Piche | G06T 19/20 345/419 |
| 2017/0011556 | A1* | 1/2017 | Hayashi | G06T 19/006 |
| 2017/0109926 | A1* | 4/2017 | Bonner | G06T 17/20 |

FOREIGN PATENT DOCUMENTS

| | | |
|---|---|---|
| JP | 2001249957 | 9/2001 |
| JP | 2010539590 | 12/2010 |
| JP | 2015019867 | 2/2015 |
| JP | 2015179517 | 10/2015 |
| WO | 2014034188 | 3/2014 |

OTHER PUBLICATIONS

German Patent Application No. 102016209671.0, Office Action dated Feb. 20, 2017, 8 pages.
Divivier et al., Virtual Try-On: Topics in Realistic, Individualized Dressing in Virtual Reality, Virtual and Augmented Reality Status Conference, http://www.human-solutions.com/virtualtryon/download/VTOBeitragVRAR2004.pdf, 2004, 8 pages.
European Patent Application No. 17173657.2, Extended European Search Report dated Oct. 20, 2017, 8 pages.
Gupta et al., The Universal Media Book: Tracking and Augmenting Moving Surfaces with Projected Information, Mixed and Augmented Reality, Oct. 1, 2006, pp. 177-180.
Mydesignlab, Video Mirror Mirror, https://vimeo.com/164654370 (website screenshot submitted), 2016, 2 pages.
Panasonic Video Mapping, Panasonic Video Mapping, available at https://jjwww.youtube.comjwatch?v=5nBUxyc6vv4, at least as early as Nov. 2, 2015, 1 page.
Saakes et al., Mirror-Mirror: an On-Body T-shirt Design System, Chi' 2016, San Jose, CA, 2016, 6 pages.
Siegl et al., Real-Time Pixel Luminance Optimization for Dynamic Multi-Projection Mapping, ACM Transactions on Graphics (TOG), vol. 34, No. 6, Oct. 26, 2015, pp. 1-11.
Wikipedia, Kinect, https://en.wikipedia.org/w/index.php?title-Kinect&oldid=721525583, May 22, 2016, 9 pages.
Japanese Patent Appl. No. 2017-109137, Office Action dated Sep. 18, 2018, 9 pages (4 pages of translation and 5 pages of original document).
Ogawa et al., "A Virtual Dress-Up System with Fast Photometric Compensation and Humanoid 3D Model Projection", ITE Technical Report, vol. 39, No. 7, Feb. 2015, 8 pages (English Abstract submitted).
Chinese Patent Application No. 201110407629.1, Office Action, dated Feb. 27, 2020, 27 pages (an English machine translation is submitted).

\* cited by examiner

APPARATUS AND METHOD FOR DESIGNING PATTERNS FOR WEARABLE ITEMS

CROSS REFERENCE TO RELATED APPLICATION

This application is related to and claims priority benefits from German Patent Application No. DE 10 2016 209 671.0, filed on Jun. 2, 2016, entitled "APPARATUS FOR DESIGNING A PATTERN FOR A WEARABLE ITEM" ("the '671 application"). The '671 application is hereby incorporated herein in its entirety by this reference.

FIELD OF THE INVENTION

The present invention relates to an apparatus and method for designing a pattern for a wearable item.

BACKGROUND

Designing is one of the most important steps in the manufacture of a wearable item, such as a piece of apparel. In a conventional linear process, the designing step is generally performed by the manufacturer of the apparel, in particular by its designer. That is, a designer initially develops a set of detailed designs including at least one pattern for the piece of apparel. Based thereon, instructions adapted for the manufacture of a number of predefined sizes of the piece of apparel are generated by persons by adapting the design to each size. However, the conventional design process is restricted to the ideas and creations of the designers and a limited set of sizes. In other words, it is quite inflexible. Moreover, changing the initial design by a person different from the designer is virtually impossible.

In the digital age, however, one option to improve the design process is to use the shape of the body of an individual wearing the piece of apparel. For example, applicant disclosed in EP 2 775 456 a method for determining the body shape of a dressed person and a display which displays an avatar with at least one item of clothing. Another method known from US 2005/0049741 A1 relates to making a pressure garment based on a 3D shape and pressure profile characteristics of a garment.

A disadvantage of these approaches in the designing process is that only a digital representation of the garments is provided and that the design cannot be further modified.

The t-shirt design machine "Mirror Mirror" of the Korean company MYDESIGNLAB (available at https://vimeo.com/164654370) allows a user to virtually design a t-shirt by using two remote controllers. Moreover, the user may draw samples with the two remote controllers or may select predefined samples.

However, this a t-shirt design machine is still too complex to operate for an ordinary user as usually at least one remote controller is needed. It is also merely a projection on the user of the image of the design that the user would see on a screen, and therefore, does not provide for a high degree of interaction since the user still has to use remote controls to choose a design. The hands are used as in many other human-computer interfaces to select the design of the shirt, thereby providing a low interactivity for designing the t-shirt.

Further, all of these known tools propose to modify a design of a piece of apparel in a post-production process, such as with pens or screen printing machines, which provide a poor quality product.

Based on the problems described above, there is a need to at least reduce the disadvantages described here. Further, there is also a need to provide an apparatus for designing a wearable item, which operates in a simple and intuitive manner.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Certain embodiments of the present invention improve the process for designing wearable items, such as apparel, clothing, jumpers, shoes, shirts, and the like. Embodiments of the present invention enable a user to intuitively generate a pattern that is customized to the shape of the user's body. For example, a virtual space can be defined to include a virtual object and an avatar representing the user. The shape of the avatar may be defined in the shape of the user. The user may visualize the virtual object (e.g., using a display device) and control the avatar's movement based on the user's movement in the real world. When the avatar intersects with the virtual object in the virtual space, the intersection causes a pattern to be formed on the avatar. The resulting pattern may be customized to the shape of the user. Further, certain embodiments of the present invention enable the user to visualize and modify the customized pattern in real-time. For example, the pattern can be modified when the user moves in relation to the virtual object. This movement causes the original pattern formed by the intersection to change to a different pattern. Thus, the user can generate a customized pattern specific to the shape of the user's body by simply positioning himself or herself in relation to a virtual object.

As only a non-limiting example and for the purpose of illustration, the user may choose to design a pattern for a sweatshirt. According to certain embodiments of the present invention, the user may enter an apparatus (described in greater detail below with respect to FIG. 1) to design a pattern for the sweatshirt. The apparatus can include position detectors to detect a position and/or shape of the user. The apparatus may then generate a virtual space representing the physical space within the apparatus. The apparatus may also generate an avatar that represents a position and shape of the user. The virtual space can be visually presented to the user (e.g., on a display device or mirror) so that the user can view and control the avatar. The user can control movement of the avatar by physically moving around in the physical space within the apparatus.

Continuing with the above non-limiting example, the virtual space may include a virtual object defined in the shape of a three-dimensional (3D) soccer ball. For example, if the user chooses to place a pattern of the 3D soccer ball on a front, upper torso of the sweatshirt, the user can control the avatar to move towards the virtual soccer ball so that the virtual soccer ball intersects with the chest of the avatar. When the avatar's chest intersects with the virtual soccer ball, the intersection causes a customized pattern to be formed (e.g., a circle contour or disk) in a manner that is specific to the shape of the user's chest. The pattern can be saved and stored as pattern data. As a benefit of the embodiments of the present application, the pattern created on the user's chest may be customized to the shape of the user's body, and modifying the pattern can be achieved in real-time when the user moves in the physical space.

According to certain embodiments of the present disclosure, an apparatus for designing patterns for wearable items may be provided. The apparatus may comprise a position detector and a data processor. The position detector may be adapted to detect a position of at least a portion of a body of a user. The data processor may be adapted to detect at least one intersection between at least one virtual object and the portion of the body of the user. Further, the data processor may compute pattern data representing a pattern for a wearable item based on the at least one intersection.

In some embodiments, the at least one virtual object may be defined in a virtual space and the data processor may be adapted to map a physical space to the virtual space, or to map the virtual space to the physical space.

In some embodiments, the data processor may be further adapted to detect the intersection of the at least one virtual object with a surface of the portion of the body of the user.

The at least one virtual object may be a three-dimensional object in a virtual space.

In some embodiments, the data processor may be further adapted to detect at least one of an intersection based on an orientation, a change of the orientation over time, a deformation in time, or a trajectory of the at least one virtual object.

In some embodiments, the at least one virtual object may include a plurality of virtual objects. The data processor may be further adapted to detect a plurality of intersections. Each intersection may be between a virtual object of the plurality of virtual objects and the portion of the body of the user. At least two of the virtual objects of the plurality of virtual objects may be located in different locations in a virtual space.

At least two other virtual objects of the plurality of virtual objects intersect with each other.

At least one color may be assigned to the at least one virtual object. The data processor may be adapted to compute the pattern data based on the at least one color.

The at least one virtual object may include a plurality of layers.

The apparatus may further comprise a memory. The memory may comprise data representing the at least one virtual object.

The memory may comprise data defining a position or an orientation of the at least one virtual object relative to at least one reference point in the virtual space.

The position detector may comprise an infrared (IR) projector and an IR sensor.

The position detector may be adapted to detect the position of at least two different portions of the body of the user.

In some embodiments, the apparatus may further comprise a display device adapted to display an image of the pattern to the user.

The display device may comprise at least one visible light projector adapted to project the image of the pattern onto the body of the user.

The display device may further comprises at least one mirror adapted to reflect a view of the user and the projection of the pattern on the body of the user.

The data processor may be adapted to render the pattern on an avatar.

A shape of the avatar may correspond to a shape of the body of the user.

According to certain embodiments of the present disclosure, a computer-implemented method for designing patterns for wearable items may be provided. The method may include detecting a position of at least a portion of a body of a user; and detecting at least one intersection between at least one virtual object and the portion of the body of the user. The method may further include computing pattern data representing a pattern for a wearable item based on the intersection.

In some embodiments, the at least one virtual object may be defined in a virtual space and a physical space may be mapped to the virtual space, or the virtual space may be mapped to the physical space.

In some embodiments, the computer-implemented method may further comprise detecting the intersection of the at least one virtual object with a surface of the portion of the body of the user.

The at least one virtual object may be a three-dimensional object in a virtual space.

In some embodiments, the computer-implemented method may further comprise detecting at least one of an intersection based on an orientation, a change of the orientation over time, a deformation in time, or a trajectory of the at least one virtual object.

In some embodiments, the at least one virtual object may include a plurality of virtual objects. The computer-implemented method may comprise detecting a plurality of intersections. Each intersection may be between a virtual object of the plurality of virtual objects and the portion of the body of the user. At least two of the virtual objects of the plurality of virtual objects may be located in different locations in a virtual space.

At least two other virtual objects of the plurality of virtual objects intersect with each other.

At least one color may be assigned to the at least one virtual object. The computer-implemented method may comprise computing the pattern data based on the at least one color.

The at least one virtual object may include a plurality of layers.

The computer-implemented method may further comprise storing data representing the at least one virtual object in a memory.

The computer-implemented method may comprise storing data defining a position or an orientation of the at least one virtual object relative to at least one reference point in the virtual space.

The computer-implemented method may include using an infrared (IR) projector and an IR sensor to detect the position of the user.

The position of at least two different portions of the body of the user may be detected.

In some embodiments, the computer-implemented method may further comprise displaying an image of the pattern to the user.

The displaying may be performed using at least one visible light projector adapted to project the image of the pattern onto the body of the user.

The displaying be may performed using at least one mirror adapted to reflect a view of the user and the projection of the pattern on the body of the user.

The computer-implemented method may further comprise rendering the pattern on an avatar.

A shape of the avatar may correspond to a shape of the body of the user.

BRIEF DESCRIPTION OF THE DRAWINGS

In the following detailed description, embodiments of the invention are described referring to the following figures.

BRIEF DESCRIPTION

The above mentioned problem is at least partly solved by an apparatus according to certain embodiments of the present disclosure. In some embodiments, the apparatus comprises (a) a position detector adapted to detect a position of at least a portion of a body of a user, and (b) a data processor adapted to compute at least one intersection of at least one virtual object and the portion of the body of the user, and pattern data representative of a pattern for the wearable item based on the intersection.

The embodiments described herein and the claimed invention enable an inexperienced user to design a piece of apparel in a simple and intuitive manner. The user can simply design one or more patterns by moving his or her body (or a part his or her body) relative to the at least one virtual object. In this way, the user defines the intersection of his body with the virtual object, which in turn defines the pattern for the wearable item. Therefore, the control of the apparatus according to certain embodiments of the present invention facilitates the creation of a pattern based on an intersection of a part of a user's body and a virtual object, rather than complicated buttons and/or remote controls, as known from the prior art. Further, the user is enabled to interactively create the external appearance of the wearable item, such as a piece of apparel.

Moreover, in certain embodiments to be described below, the user may receive an immediate (or slightly delayed) feedback concerning the modifications made (e.g., by changing the position of the at least one portion of his or her body relative to the virtual object). For example, one or more projectors can display the created and/or modified pattern for the wearable item on the contour of the body of the user. As a further example, any number of projectors (e.g., two, three, or four projectors), may ensure the projection of the pattern on different sides of the body of the user. Therefore, the user can better appreciate the pattern, which is based on the intersection of his body with the virtual object. In some embodiments, at least a mirror may be placed on at least one side of the interaction space for the user to conveniently see himself and the projections on him.

In some embodiments, the apparatus may be used in various environments. For example, the apparatus may be provided within a typical cubicle of a department store. In some embodiments, only a support structure for the position detector and the data processor (e.g., a computer) is provided so that the operation of the apparatus may be followed by a viewer and/or a salesperson, or the like. It should be appreciated that in some embodiments of the present invention, the apparatus is adapted to interact with the user and/or smartphones, mobile apps, social networks, the Internet, and the like.

Further, the apparatus according to certain embodiments of the present invention may be operated without having to use an additional device, such as a remote controller. This aspect particularly facilitates the use of the apparatus by users with little or no experience with interactive technology.

"Body", "part of the body" and "portion of the body" in the context of the present invention may include the body itself of the user or a worn apparel on this body. It is also to be appreciated that the "body," "part of the body" and/or "portion of the body" refers to the physical, real body of the user or the worn apparel worn on the user's body. In some embodiments, the "body," "part of the body," and/or "portion of the body" may refer to a virtual representation of the user's body or the worn apparel on the virtual representation of the user's body. Thus, the data processor may be adapted to determine whether the user engaged in the design process actually wears an apparel, or whether he does not wear an apparel during the design process. Accordingly, in the context of the present invention, computing at least one intersection of at least one virtual object and the portion of the body of the user may include computing an intersection of the virtual object and a virtual representation of the body of the user or a portion of the user's body. For example, based on the position of the portion of the body of the user, an avatar representing the user's body or a portion of the user's body may be computed. Subsequently, the intersection of the avatar or of a portion of the avatar and the virtual object may be computed. Thus, the intersection may be computed in physical space or in a virtual space as will be described in more detail below.

"Pattern" in the context of the present invention relates generally to any sort of pattern (for example a knitted, woven, embroidered or stitched pattern and the like), design, graphic, drawing, picture, decoration, logo, understood as a single or a combination of shapes, lines, symbols, shadings, textures, etc. with or without colors.

"Pattern data" in the context of the present invention relates to data representative of the pattern to be designed. For example, pattern data may refer to digital data that describe the pattern, like for example in the form of image data (e.g., a raster image, a vector image, etc.). Pattern data may also refer to instructions for a manufacturing machine, like for example knitting instructions for a knitting machine.

The virtual object may be defined in a virtual space and the data processor may be adapted to map the physical space to the virtual space and/or to map the virtual space to the physical space. Thus, the data processor may compute the intersection of the portion of the body of the user and the virtual object in either the virtual space or the physical space. "Physical space" in this context relates to the usual three-dimensional space in which humans usually perceive the world around them. "Virtual space" relates to the space in which the virtual object is defined. It may be a space of arbitrary dimension, but in some embodiments, is a three-dimensional space, so that the data processor may compute a one-to-one mapping between points in physical space and the virtual space.

According to certain embodiments of the present invention, the virtual object is "virtual" in the sense that it does not exist as a physical object in physical space, but that it is defined as an object in the virtual space. Due to the mapping between the physical space and the virtual space (or vice versa), it is possible to treat the virtual object as a physical object in physical space (e.g., to treat the portion of the body of the person as a virtual object in virtual space), and thus, to compute or detect the intersection of the portion of the body of the user and the virtual object.

As a non-limiting example, the virtual object may be a sphere with a size comparable to a soccer ball and the user may position his chest, such that it intersects the sphere. In this case, the intersection of his upper body with the sphere has the shape of a spherical cap. Further, the pattern may have the shape of a circle based on the intersection (e.g., a disk or a contour of the virtual object with a given thickness) on the user's chest. It should be appreciated that more complex virtual objects and/or a plurality of virtual objects may lead to much more complex patterns. According to certain embodiments of the present invention, the user may change the pattern simply by changing his position relative to the virtual object(s), so that the intersection changes accordingly. Thus, while the resulting pattern may be complex, the design process is simple and intuitive.

The data processor may further be adapted to compute the intersection of the virtual object with a surface of the portion of the body of the user. Thus, the data processor may directly derive a two-dimensional pattern from the two-dimensional intersection on the surface of the portion of the body of the user. In the above example, the data processor could derive the intersection of the sphere with the surface of the user's chest. The resulting pattern would have the shape of a circle (e.g., a disk or the circle's contour).

In some embodiments, the virtual object may be a three-dimensional object defined in the virtual space. Thus, the intersection with the part of the body of the user and the resulting pattern may be rather complex and result in interesting and aesthetically appealing patterns. For example, the virtual object may have the shape of a sphere, a cube, a pyramid, etc., but may also have more irregular shapes based, for example, on mathematical fractals or even on representations of existing objects like natural objects, sports equipment, famous athletes, stadiums, and the like. The present invention is not limited to the examples of virtual objects described herein.

The data processor may further be adapted to compute or detect the intersection between the virtual object and the user's body (or the avatar representing the user's body) based on a position of the virtual object, a change in the position of the virtual object, an orientation, a change of the orientation over time, a deformation in time, and/or a trajectory of the virtual object. Thus, for example, the position, or orientation, and/or shape of the virtual object in the virtual space may be constant over time, or in some embodiments, may change over time. For example, a sphere may "morph" into a cube. The user may then wait, without moving, until the pattern derived from the intersection of a portion of his body and the virtual object appears to be aesthetically appealing to him.

Additionally, the morphing and/or movement of the virtual object may be related to other factors. For example, it may be synchronized or depending on other factors. Examples of the factors may include the movement of the user (e.g., past movements, a specific movement with a determined portion of the user's body, etc.), the user's speed, the user's acceleration, the interaction of the user's body with the shapes (e.g., collisions under physics law), and other suitable factors. As additional examples, the factors may also comprise music, live data, social media interactions, and so on. As a non-limiting example, the morphing or movement of the virtual objects may correspond to music played in conjunction with displaying the virtual object.

The data processor may be adapted to generate a snapshot of the pattern created by the intersection between the virtual object and the user or the avatar of the user. For example, the user may indicate that he or she is satisfied with the resulting pattern, and the data processor may store the current pattern data in a database or on a storage medium. In some embodiments, the current pattern data may be transmitted to a manufacturing machine (automatically or based on a command received from the user). Additional examples of a manufacturing machine may include pressing machines, sewing machines, knitting equipment, cutting machines, 3D printing machines (e.g., a 3D printer that prints a 3D object using a material), finishing machines, and other suitable manufacturing machines. In some examples, when the manufacturing machine is a 3D printing machine, the pattern data may be code that instructs the 3D printing machine to print the wearable item using a material. The pattern data representing the snapshot may then be used for manufacturing the wearable item, e.g., a piece of apparel like a jumper. The data processor may be adapted to receive the indication by the user or another person pressing a button, performing a predefined movement (e.g., a gesture or voice order) or based on a timer elapsing. A video of the interaction between the user and the virtual objects may also be recorded, so that a person, in particular the user, may replay the video at other places and moments, and select one or more appealing patterns.

The data processor may further be adapted to compute or detect a plurality of intersections between a plurality of virtual objects and the portion of the body of the user. The virtual objects may be located at different locations in the virtual space. Thus, complex patterns may result from intersections between the portion of the body of the user and the virtual objects. As a non-limiting example and for the purpose of illustration only, the virtual objects may be multiple spheres at different locations. In this example, the resulting pattern may be a plurality of circles or of concentric circles (e.g., a disk or the circle's contour). The user may change the position of the circles by changing the position of the part of his body. For example, changing the position may correspond to a translation or rotation, or both, of the virtual objects.

Additionally, the virtual objects may be different shapes. Thus, for example one virtual object may have a spherical shape, whereas, another virtual object may have a cubical shape. In some embodiments, different regions of the virtual space may each contain a specific sort of shape distinct from the shape contained in another region of space. For example, a first region of the virtual space may contain shapes, such as cylindrical tubes, and another region of the virtual space may contain square cross-section tubes. The user may more easily select between one sort of graphic and another while still being able to obtain a very distinctive pattern from others if the density and sizes of the shapes are not homogenous in each of the regions of the virtual space. Different virtual objects with different shapes may result in a complex and visually more appealing pattern. It also helps to provide each user with a personal pattern distinctive from most of other patterns produced by other users.

Additionally, the virtual objects may be different sizes. For example, many spheres of different sizes may be simulated in the virtual space.

At least two virtual objects may intersect with each other. Thus, for example two intersecting spheres may result in a pattern of two intersecting circles. In this way, the pattern may become more interesting, complex, and customized. Further, at least a first virtual object may be included in a second virtual object of a bigger size.

At least one color may be assigned to the virtual object and the data processor may be adapted to compute the pattern data based on the color. Thus, the pattern may comprise different colors and the user may influence the distribution of color simply by changing the position of the part of his body.

Further, the virtual object may comprise a plurality of layers. In some embodiments, at least two layers may comprise different colors. In some embodiments, at least two layers may comprise different thicknesses. These embodiments follow the same idea of providing an improved designing process of the wearable item for the user.

The apparatus may comprise a memory that comprises data representative of the virtual object. The memory may comprise data defining a position and/or an orientation of the virtual object. Moreover, the data may further define at least one real-time deformation for the at least one virtual object. In some embodiments, the data may define a spatial relationship between at least two virtual objects. In this way, the memory may be provided with data associated with virtual objects which result in visually appealing patterns. The shapes, orientations, positions, and/or real-time transformations of the virtual object(s) may be provided by designers and stored in the memory. The user may interact with the virtual objects by changing the position of the part of his body so that different parts of the virtual objects intersect with the part of his body. In this way, the user may directly influence the appearance of the pattern resulting from the intersection, although doing so in the limits fixed by the designer's presetting or the virtual object(s).

The position detector may comprise an infrared (IR) projector and IR sensor. IR radiation has the advantage that it is comparatively easy to generate, safe for the user's body, for example, in contrast to e.g. X-rays, and invisible. Moreover, the source for such radiation may be simply provided with common diodes.

The position detector may be adapted to detect the position of different portions of the body of the user. For example, the position detector may be adapted to detect the position of the user's torso, arms and legs. The detection may be based on an image analysis that is implemented by code (e.g., a software program) that is executing on a computing device. Thus, for example, as the user changes the position of his arms, but not of his torso and legs, he is able to change the pattern for his arms only, whereas, the pattern for the torso remains the same. In this way, more detailed adaptations of the pattern are possible.

In some embodiments, the wearable item may be a piece of clothing. For example, the piece of clothing may be a jumper, a t-shirt, trousers, pants, a jersey, a leotard, a sock, a shoe, in particular a shoe upper, and so on. As a benefit of certain embodiments of the present invention, flexible pieces of clothing can be designed and customized with ease, although their design was usually rather complex and did not allow for customization or individualization prior to the present invention.

The apparatus may further comprise a display device adapted to display an image of the pattern to the user. Thus, the user may be provided with direct and immediate feedback about the pattern and how the final wearable item would look.

The apparatus may comprise a display device adapted to display an image of the pattern to the user. The display device may comprise at least one visible light projector adapted to project the image of the pattern onto the body of the user. The display device may comprise more than one projector in order to project patterns on different portions of the user's body. In some embodiments, the projectors may be synchronized in order to obtain a consistent representation of the item. Additionally, an apparatus according to certain embodiments of the present invention comprises at least a data processor adapted to morph the image of the pattern to the shape of the user to determine that the user's body surface is not flat.

The display device may further comprise at least one mirror adapted for the user to see himself and projections of the pattern on his body. In some embodiments, the mirror may be equipped with an image display (e.g., a screen) so as to overlay the images of the patterns to the reflected image of the user in the mirror. Thus, the user may directly see the resulting pattern on his body and he may change the pattern by moving his body or at least a part thereof. This provides for a very simple and effective design process, which nevertheless allows for the creation of very complex, customized by the user and visually appealing patterns.

The data processor may be adapted to render the pattern on an avatar. The avatar is a virtual representation of the user used to convey a realistic impression about the appearance of the finished piece of apparel by showing an image of the avatar wearing the wearable item. The shape of the avatar may correspond to the shape of the body of the user. The avatar may be created and/or modified based on the position of at least a portion of the body of the user. Thus, the avatar may be shown as "wearing" a digital version of the item of clothing for which the pattern is to be designed. In this way, the user may get an impression of how the wearable item with the resulting pattern would look like.

The avatar may also be represented in a characteristic posture. For example, if the user is about to design a soccer jersey, the avatar may be shown during a shot. In another example, the user may be in the process of designing a running shirt and the avatar may be shown running and wearing a running shirt comprising the current pattern.

A further aspect of the present invention relates to a method for designing a pattern for a wearable item, comprising: (a.) detecting the position of at least a portion of a body of a user; (b.) computing at least one intersection of at least one virtual object and the portion of the body of the user, and (c.) computing pattern data representative of a pattern for the wearable item based on the intersection.

The disclosure provided herein with respect to the apparatus is also valid for the corresponding method as well. For example, the embodiments described with respect to the apparatus may also be implemented as a method (described in greater detail herein).

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various embodiments of the present invention are described in the following detailed description. However, emphasis is placed on the fact that the present invention is not limited to these embodiments. The apparatus and method described herein may be used for designing and manufacturing a wearable item in general, such as a piece of apparel like for example, a jumper, a sweater, pants, shorts, a t-shirt, shoes, etc.

It is also to be noted that individual embodiments of the invention are described in greater detail below. However, it is clear to the person skilled in the art that the design possibilities and optional features described in relation to these specific embodiments may be further modified and combined with one another in a different manner within the scope of the present invention and that individual steps or features can also be omitted where they appear to be unnecessary. In order to avoid redundancies, reference is made to the explanations in the previous sections, which also apply to the embodiments of the following detailed description.

Figure 1:
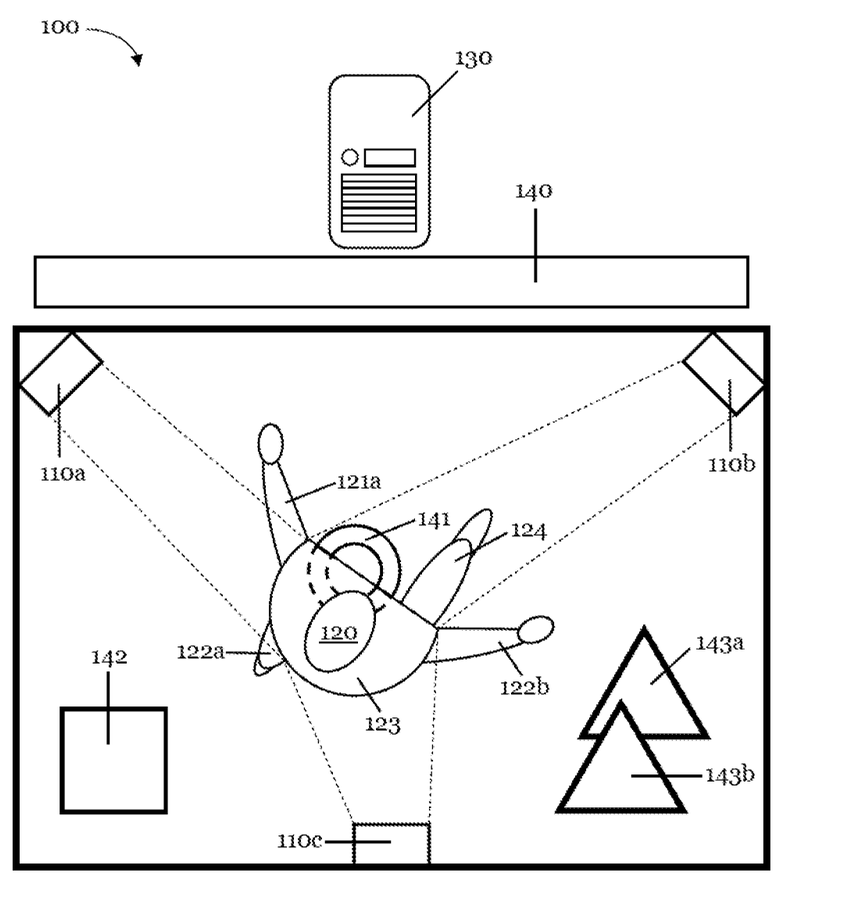
FIG. 1 illustrates a schematic top view of an apparatus for designing a piece of apparel, according to certain embodiments of the present invention.

FIG. 1 illustrates a schematic top view of an apparatus 100 for designing a piece of apparel, according to certain embodiments of the present invention. As a non-limiting example and for the purposes of illustrates, the piece of apparel may be a jumper. The apparatus 100 comprises position detectors 110 adapted to detect a position of at least a portion of a body of a user 120. In the example illustrated in FIG. 1, the position detector 110 comprises position detectors 110a, 110b and 110c. Position detector 110a may be located in front of the user 120 to his left, position detector 110b may be located in front of the user 120 to his right, and position detector 110c may be located in the rear of the user 120. The number of position detectors may vary and position detector 110 may comprise any number of position detectors (e.g., one position detector may be sufficient).

The position detector 110 in the example illustration of FIG. 1 may use infrared (IR) radiation. As mentioned above, IR radiation may have the benefit that it is comparatively easy to generate and that it is safe for the user's body, for example, in contrast to e.g. X-rays. Thus, the position detectors 110a, 110b and 110c comprise an IR source, such as an IR emitting diode, and an IR detector, such as an IR sensitive diode. IR radiation is reflected by the user's body and based on the time of flight of the IR light, the position of the body of the user or of a part of the user's body is computed. The IR detector may alternatively comprise an IR sensitive camera which may determine the position of single parts of the user's body with high precision. In some embodiments, it may be sufficient to use just a single position detector, possibly located right in front of the user.

The position detectors 110a, 110b, and 110c may be adapted to detect the position of the entire body of the user 120. This position may for example refer to the center of the user's torso 123 or to the center of the user's head. The position detectors 110a, 110b, and 110c may also be adapted to detect a position of a certain portion of the body of the user 120. For example, the position detectors 110a, 110b, and 110c may be adapted to detect the position of the left arm 121a and the right arm 121b. The position detectors 110a, 110b, and 110c may further be adapted to detect the position of the torso 123. The position detectors 110a, 110b, and 110c may further be adapted to detect the position of the left leg 122a and the right leg 122b. The position detectors 110a, 110b, and 110c may be adapted to detect the position of a first portion of the body of the user 120 relative to the position of a second portion, distinct from the first portion, of the body of the user.

The position detectors 110a, 110b, and 110c may also be adapted to detect the position of the joints, articulations, or gestures of the user through the movement of the body portions and/or through direct measurement. For example, the distance between the two shoulders may be obtained. Thus, an avatar of the user may be constructed or a pre-selected avatar may be customized to characteristics of the user's body. The position detectors 100a, 110b, and 110c may be adapted to create a virtual articulated skeleton representative of the main joints of the user's body (e.g., elbows, knees, shoulders, and so on).

"Body" 120 and "parts of the body" 121a, 121b, 122a, 122b, and 123 in the context of the present invention may include a worn apparel or not. Thus, the data processor 130 to be described below in more detail may be adapted to determine whether the user engaged in the design process actually wears an apparel, or whether he does not wear an apparel during the design process.

In some embodiments, other techniques for detecting the position of at least a part of the body of the user 120 may be used in the present invention individually or in combination, such as cameras coupled to image analysis, ultrasonic sound, a mat with electric contacts, capacitive sensors, radar, and the like. For example, the IR projector and sensor described above may be coupled to at least one camera.

The apparatus 100 also comprises data processor 130 adapted to compute at least one intersection of at least one virtual object 141, 142, 143a, 143b and portions of the body 121a, 121b, 122a, 122b, and 123 of the user, and pattern data representative of a pattern for the wearable item based on the intersection.

In the example of FIG. 1, four virtual objects are shown as an example. The virtual object 141 is a sphere, which is shown as a circle due to the simplified two-dimensional illustration of FIG. 1. The virtual object 142 is a cube which is shown as a square due to the simplified two-dimensional illustration of FIG. 1. The virtual objects 143a and 143b are two overlapping (i.e., intersecting) pyramids which are shown as triangles due to the simplified two-dimensional illustration of FIG. 1. It should be appreciated that more complex virtual objects and/or a plurality of virtual objects (e.g., overlapping or intersecting virtual objects) may lead to much more complex patterns. Using certain embodiments of the present invention, the user may change the pattern simply by changing his position relative to the virtual object(s), so that the intersection changes accordingly. Thus, while the resulting pattern may be complex, the design process is simple and intuitive.

As schematically shown in FIG. 1, each of the virtual objects 141, 142, 143a, and 143b is provided with a different shape and a different position, however, the present invention is not limited to the illustrated shapes and positions. In some embodiments, virtual objects may be of any type, for example, dots in space, a 'one'-dimensional or two-dimensional curve in space, an open or a closed surface in space, or a volume in space.

The virtual objects 141, 142, 143a, and 143b are defined in a virtual space, i.e. the data processor 130 stores object data representative of the characteristics of the virtual objects. Examples of characteristics of shapes may include shape, color, position in such a virtual space, and in some cases evolution of shape, color, and/or position in time. For example, for the sphere 141, the data processor 130 could store the position of its center and its diameter. For the cube 142, the data processor 130 could store its center, the position of the center and the length of its edges. In some embodiments, it is also possible that the data describing the virtual objects is stored in another format, for example, as a collection of points in three-dimensional space, connected by various geometric entities, such as triangles, lines, curved surfaces, etc. The coordinates of the virtual objects 141, 142, 143a, and 143b may be defined relative to some reference point of the apparatus 100, for example, a reference point correlated to the interaction space for the user. In this way, it is possible to compute the physical relation (e.g., distance, orientation, intersection, etc.) of the virtual object to the body of the user 120 as will be described in more detail below.

The data processor 130 may be adapted to map the physical space to the virtual space and/or to map the virtual space to the physical space. Thus, the data processor 130 may compute the intersection of the portion of the body of the user 120 and the virtual objects 141, 142, 143a, and 143b in either the virtual space or the physical space. "Physical space" in this context relates to the usual three-dimensional space in which humans usually perceive the world around them. "Virtual space" relates to the space in which the virtual objects 141, 142, 143a, and 143b are defined. It may be a space of arbitrary dimension, but in some embodiments, is a three-dimensional space, so that the data processor 130 may compute a one-to-one mapping between points in physical space and the virtual space.

According to certain embodiments of the present invention, the virtual objects 141, 142, 143a, and 143b are "virtual" in the sense that they do not exist as a physical object in physical space, but that they are defined as objects in a virtual space. Due to the mapping between the physical space and the virtual space (or vice versa), it is possible to treat the virtual objects 141, 142, 143a, and 143b as physical objects in physical space (or in some embodiments, to treat the portions 121a, 121b, 122a, 122b, and 123 of the body of the user 120 as a virtual object in virtual space), and thus, to compute the intersection of any of the portions 121a, 121b, 122a, 122b, and 123 of the body of the user 120 and the virtual objects 141, 142, 143a, and 143b.

Due to the relation between the physical space and the virtual space in which the virtual objects 141, 142, 143a, and 143b are defined, it is possible to obtain a physical relation between the body of the user 120 or parts of the user (e.g., the arms 121a, 121b, legs 122a, 122b or torso 123). For example, the data processor may determine the distance between the body (or parts thereof) and a virtual object 141, 142, 143a, or 143b, or determine whether the body (or parts thereof) intersects a virtual object 141, 142, 143a, or 143b and how this intersection looks. In this way, the virtual objects become "real" or at least "visible" objects as the user may interact with them during the pattern design process described herein.

Thus, as shown in the example illustration of FIG. 1, the sphere 141 intersects with the upper torso 123 (e.g., the user's chest). For example, the intersection has the shape of a spherical cap, and the two-dimensional pattern extracted for the design of a jumper based on the intersection has the shape of a circle. In this example, the pattern data corresponds to a circle. If the pattern data were instructions for a knitting machine, the knitting machine would knit a jumper (in the example of FIG. 1) with a circle on the chest. The pattern could be distinguished from the surrounding areas of the jumper by its color, the knitting pattern, the yarn used, etc.

As an illustrative example, if the user 120 moves from the sphere 141 to the cube 142, (e.g., if the user takes a step back in the physical space), the resulting pattern would change because the intersection of the cube 142 with his body 120 (or a part thereof) would be different as compared to the sphere 141. The intersection resulting from the cube 142 and the user's body would have the shape of a square, rectangle or triangle depending on the orientation of the user's body (or a part thereof) relative to the cube 142. It should be noted that any curvature on the user's body may lead to more complex intersections and corresponding patterns. Additionally, if the body of the user is so positioned that the cube crosses over from one side of his body to the other side of his body, a pattern may be created both on the back of the jumper and on the front of the jumper, back and front patterns being potentially different.

Similarly, if the user 120 moves to the two intersecting triangles 143a and 143b, the resulting pattern would be similar to two intersecting triangles, again depending on the orientation of the user's body (or a part thereof) to the triangles 143a and 143b.

In some embodiments, the virtual objects 141, 142, 143a, and 143b change over time. For example, the virtual objects may follow a certain trajectory, change their orientation, change their color, change their size and/or deform. As a further example, the sphere 141 could "morph" or transform into a cube, similar to the cube 142, and back again to a sphere. This could take place within a few seconds, minutes, hours, or any time period.

The virtual objects 141, 142, 143a, and 143b may also comprise a plurality of layers which differ by a feature, for example, by color. Thus, the intersection with the body of the user 120 would lead to a multi-color pattern. The layers may have different thicknesses, as well. The layers may also differ by the knitting structure they represent, by color, and/or by yarn types.

The data processor 130 may be a computer, such as a desktop computer, laptop, notebook, server computer, embedded computer or the like. It may also be a mobile device, such as a smartphone, tablet computer, etc. The data processor 130 may also be located remote from the position detector 110 and connected thereto via a wired or wireless connection. For example, the data processor 130 may be a computer in a cloud and connected to the position detector 110 via the internet. The process steps described herein may be embodied in hardware, in software or in a combination of hard- and software in the data processor 130.

In the example illustration of FIG. 1, the apparatus 100 also comprises an optional display device 140 adapted to display an image of the pattern to the user 120. In the example of FIG. 1, an image of the pattern is projected onto the body of the user 120 using visible light projectors (indicated with dashed lines) which are included in the position detectors 110a, 110b and 110c. Part of the display device 140 may be a mirror positioned in front of the user. The mirror 140 may be a mirror, such as usually arranged in cubicles. Thus, the user 120 is able to see the pattern resulting from the intersection of the virtual object (e.g., the sphere 141 in FIG. 1) with his body (e.g., the chest in the example of FIG. 1) in real-time in the mirror.

In some embodiments, the apparatus 100 comprises separate visible light projectors to project the resulting pattern on the body of the user 120. In some embodiments, the display device may comprise a camera and at least one screen, such as a TV or computer monitor, so that the user 120 may design the pattern for the wearable item at home. In some embodiments, for example, a virtual reality headset which would allow the user to see a digital representation of the piece of apparel on himself and/or represented on virtual screens around him. Additionally, the use of a virtual reality headset may be useful to provide the user with a visualization of the virtual objects. The user would then be able to see the virtual object and create his pattern with the knowledge of the objects. The experience of designing his wearable item would also be more immersive—with the user being able to see the virtual object crossing his body, creating a deeper link between the customer and the brand, even more so by combining the possibility of adding sounds or music to the user's experience.

In some embodiments, the data processor 130 may be further adapted to render the resulting pattern on an avatar.

The avatar may be selected or created automatically without intervention of the user, or the user may be able to select an avatar for himself. The avatar may be a pre-stored or "default" avatar, or it may also be pre-stored avatar selected from a plurality of available pre-stored avatars, based on at least one characteristic of the user, such as some body data (e.g. height, sex and weight), or it may be an avatar of the user, for example, based on detailed body data of the user (e.g., obtained with a three-dimensional scan of at least a portion of the body of the user). Therefore, it is beneficial to obtain body data of the user before the pattern is created through the interaction of the user and the virtual objects in order to make the rendering of the virtual intersection between the avatar and the virtual object more realistic. Indeed, the body data of the user can then be used to obtain an avatar representative of the user. Using an avatar based on the body data of the user can also improve the preview of the piece of apparel while creating and/or selecting the pattern because the pattern may be represented on a virtual piece of apparel having the customized size created for the user, and being worn by an avatar the size of the user.

For example, the avatar may be created based on the body of the user 120 and may wear a digital representation (e.g., a digital model) of the wearable item. The position of the user in the physical space is determined (e.g., by position detectors) and the position of the avatar is modified in the virtual space to correspond to the position of the user in the physical space. The intersection between the avatar or the digital representation of the wearable item and the virtual object is then computed so as to produce the pattern data. The digital representation of the wearable item may also be adapted with an image of the resulting pattern on the avatar.

An image of the pattern on the digital representation of the wearable item may be acquired and stored in a memory (not shown in FIG. 1). The intersection between the virtual object(s) and the digital model of the wearable item when worn by the avatar in the acquisition position is then determined and stored as a file, for example, as an image file. For example, a predetermined number of points of the digital representation of the wearable item are referenced, so that the pattern may be reproduced on a two-dimensional representation of the wearable item (e.g., a template). Therefore, the image stored of the pattern may be one or more two-dimensional images. Contrary to acquisition of images of the user by a camera while interacting with the virtual objects, this process has the benefit of producing a pattern corresponding to the real shape of the wearable item. In some cases, the fit of the wearable item may be very different from the fit of the corresponding item that the user is wearing when interacting with the apparatus (e.g., the selected wearable item being customized is a long-sleeve loose jumper but the user wears a tight t-shirt when interacting with the customization device). This technique may also be used to project the correct pattern on the user regardless of the piece of apparel he may be currently wearing when interacting with the apparatus to design a piece of apparel.

To do so, the two-dimensional image of the wearable item (or template) is triangulated. Each portion of the two-dimensional image is reported on the digital representation of the item worn by the avatar. When a pattern is acquired to be stored, each triangulated portion of the digital representation in the virtual space is reported on the two-dimensional image with a corresponding color so that a two-dimensional image of the article is obtained with a pattern corresponding to the intersection of the user and the virtual object.

The acquisition may be performed at given times, random times, or moments triggered by the user 120 (e.g., with a remote control, a voice control, predefined gestures, etc.) or by another individual, such as a salesman or a friend of the user 120. In some embodiments, the acquisition may be triggered using artificial intelligence techniques based on inputs, such as the attitude or expression of the user 120. The body posture of the body of the user 120 as determined by the position detectors 110a, 110b, and 110c may be captured at a selected moment for capturing (e.g., by pressing a button that causes the position detectors to capture the position of the user). This body posture may then be reproduced by the digital avatar for representation to the user and determination of the pattern based on the intersection between the virtual object and the avatar or the digital representation of the wearable item.

In some embodiments, the wearable item may keep a 'memory' of the virtual objects intersected in a past predetermined duration, leading to even more diverse designs as the design would be based on the current and past positions of the user. In these embodiments, instances of intersections between the user 120 and the virtual objects may be tracked and stored so as to be accessible in the future.

In some embodiments, the apparatus 100 may also comprise a user interface adapted to display the patterns acquired or captured, and stored during the interaction between the user and the virtual objects in the customization space of a device according to certain embodiments of the present invention.

In some embodiments, the apparatus 100 may also comprise a user interface adapted to display a menu or window for selecting a color and/or color combinations for the virtual objects 141, 142, 143a, and 143b, the pattern and/or for the wearable item. The selection may be available to the user before and/or after interacting with the virtual objects in the customization space while viewing the stored pattern(s). Certain combinations of colors may be available to the user, as predetermined by a designer, for example. In some embodiments, the user interface may show the availability of the materials, such as yarns, needed for the manufacturing of the wearable item. For example, if a knitting machine (not shown in FIG. 1) with a certain combination of yarns may have a long list of orders, the color combination may be unavailable on a color selection area of the user interface to the user 120 during a given duration. The duration may be calculated depending on the number of items in the order list of the knitting machine.

An apparatus according to certain embodiments of the present invention may also comprise a data processor adapted to adjust sample data with the pattern data. The sample data can serve as a starting point for the manufacture of a wearable item, such as a piece of apparel, and the data may subsequently be modified and adjusted. The sample data may hence provide a kind of "design blank" (e.g., which may be chosen by the user from among a number of available blanks) and be created by the original designer of the brand. For example, the design blank may comprise information including, but not limited to, the external look and shape of the piece of apparel, and the provision for some technical area, such as breathable constructions in determined areas, non-customizable areas, and/or portions with more or less stretch built-in the rest of the piece of apparel, and other suitable information.

In some embodiments, the sample data defines customizable portions of the item and non-customizable portions of the item, and the data processor may be adapted to only compute the pattern obtained by the intersection of the customizable portions of the item with the virtual object.

The design blank may therefore subsequently be modified and adjusted to a specific user's pattern data. Once the modification and adjustment of the sample data is complete, manufacturing data may be generated which may be representative of machine instructions used to control a manufacturing machine to create the piece of apparel with the specification profile (size, colors, fit, pattern, etc.) as represented by the modified sample data.

Modifying the pattern data and/or the manufacturing data may, for example, enable the user to adjust or modify a knitting pattern of the piece of apparel, the size, color, base material of the piece of apparel, and so on. In this way, the user may actively participate in the design process of the piece of apparel before its manufacture. The user may, for example, customize the pattern according to his or her needs and preferences, giving him a large degree of influence over the appearance of the piece of apparel.

Additionally, the adjustment or generation of a digital knitting manufacturing file with the pattern data may include at least the adjustment of a yarn feeding device that is introducing the yarn to the knitting needles for each knitting loop or row to modify the yarn color or yarn type from one loop to another and/or from one row to another. That allows obtaining a built-in pattern or design that is durable and of high quality, with the possibility to adjust the color of the pattern in many different manners, and/or to adjust the yarn type in order to obtain different functional zones.

As a result, the apparatus 100 provides for the first time a device for designing a pattern for a wearable item in an intuitive manner and is easy to operate for an ordinary customer.

In the following, further examples are described to facilitate the understanding of the invention:

1. Apparatus (100) for designing a pattern for a wearable item, comprising:
   a. position detection means (110*a*, 110*b*, 110*c*) adapted to detect a position of at least a portion of a body of a user (120); and
   b. data processing means (130) adapted to compute
      at least one intersection of at least one virtual object (141) and the portion of the body of the user (120), and
      pattern data representative of a pattern for the wearable item based on the intersection.

2. Apparatus (100) according to the preceding example, wherein the virtual object (141) is defined in a virtual space and the data processing means (130) is adapted to map the physical space to the virtual space and/or to map the virtual space to the physical space.

3. Apparatus (100) according to one of the preceding examples, wherein the data processing means (130) is further adapted to compute the intersection of the virtual object (141) with a surface of the portion of the body of the user (120).

5. Apparatus (100) according to the preceding example, wherein the virtual object (141) is three-dimensional.

6. Apparatus (100) according to one of the preceding examples, wherein the data processing means (130) is further adapted to compute the intersection based on an orientation, and/or a change of orientation over time, and/or a deformation in time, and/or a trajectory of the virtual object (141).

7. Apparatus (100) according to one of the preceding examples, wherein the data processing means is further adapted to compute a plurality of intersections of a plurality of virtual objects (141, 142, 143*a*, 143*b*) and the portion of the body of the user (120), wherein the virtual objects (141, 142, 143*a*, 143*b*) comprise different locations in a virtual space.

8. Apparatus (100) according to the preceding example, wherein the virtual objects (141, 142, 143*a*, 143*b*) comprise different shapes.

9. Apparatus (100) according to one of examples 6 or 7, wherein at least two virtual objects (143*a*, 143*b*) intersect with each other.

10. Apparatus (100) according to one of the preceding examples, wherein at least one color is assigned to the virtual object (141, 142, 143*a*, 143*b*) and the data processor is adapted to compute the pattern data based on the color.

11. Apparatus (100) according to one of the preceding examples, wherein the virtual object comprises a plurality of layers.

12. Apparatus (100) according to the preceding example, wherein at least two layers comprise different colors.

13. Apparatus (100) according to one of examples 10 or 11, wherein at least two layers comprise different thicknesses.

14. Apparatus (100) according to one of the preceding examples, further comprising a memory, the memory comprising data representative of the virtual object (141, 142, 143*a*, 143*b*).

15. Apparatus (100) according to the preceding example, wherein the memory comprises data defining a position and/or an orientation of the virtual object (141, 142, 143*a*, 143*b*) relative to at least one reference point of the apparatus (100).

16. Apparatus (100) according to one of the preceding examples, wherein the position detection means (110*a*, 110*b*, 110*c*) comprises an IR projector and an IR sensor.

17. Apparatus (100) according to one of the preceding examples, wherein the position detection means (110*a*, 110*b*, 110*c*) is adapted to detect the position of different portions of the body of the user (120).

18. Apparatus (100) according to one of the preceding examples, wherein the wearable item is a piece of clothing.

19. Apparatus (100) according to one of the preceding examples, further comprising a display device adapted to display an image of the pattern to the user.

20. Apparatus (100) according to the preceding example, wherein the display device comprises at least one visible light projector adapted to project the image of the pattern onto the body of the user (120).

21. Apparatus (100) according to the preceding example, wherein the display device further comprises at least one mirror (140) adapted for the user to see himself and projections of the pattern on his body.

22. Apparatus (100) according to the preceding examples, wherein the data processing means (130) is adapted to render the pattern on an avatar.

23. Apparatus (100) according to the preceding example, wherein the shape of the avatar corresponds to the shape of the body of the user (120).

24. Method for designing a pattern for a wearable item, comprising:
  detecting the position of at least a portion of a body of a user (120);
  computing at least one intersection of at least one virtual object (141) and the portion of the body of the user (120); and
  computing pattern data representative of a pattern for the wearable item based on the intersection.

The examples described above with respect to the apparatus also apply to the method of example 24.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An apparatus for designing patterns for wearable items, the apparatus comprising:
  a position detector adapted to detect a position of at least a portion of a body of a user within a physical space; and
  a data processor adapted to:
    generate a virtual space that represents the physical space, the virtual space including at least one virtual object;
    generate an avatar within the virtual space, the avatar representing the portion of the body of the user;
    generate a digital representation of a wearable item within the virtual space, the digital representation of the wearable item being worn by the avatar, and the wearable item having a shape in the physical space;
    detect a two-dimensional (2D) pattern created by at least one intersection between the at least one virtual object and a surface of the digital representation of the wearable item, the 2D pattern being formed on the surface of the digital representation of the wearable item at one or more points of the at least one intersection, the at least one intersection being caused by controlling the avatar wearing the digital representation of the wearable item to intersect with the at least one virtual object, wherein the 2D pattern is modifiable in response to repositioning of the digital representation of the wearable item, and wherein the repositioning of the digital representation of the wearable item is caused by movement of the portion of the user within the physical space;
    extract the one or more points of the 2D pattern formed on the surface of the digital representation of the wearable item;
    generate a 2D image of the digital representation of the wearable item intersecting with the at least one virtual object
    map at least one point of the one or more points of the 2D pattern onto one or more portions of the 2D image, the one or more portions of the 2D image corresponding to the 2D pattern fitted onto the shape of the wearable item;
    generate pattern data based on the one or more portions of the 2D image, the pattern data representing the one or more points of the 2D pattern fitted onto the shape of the wearable item; and
    render the pattern data to generate a graphic, the graphic being customized to the shape of the wearable item worn by the user using the one or more points of the 2D pattern, and the graphic being applied onto the wearable item.

2. The apparatus of claim 1, wherein the at least one virtual object is defined in the virtual space and the data processor is adapted to map the physical space to the virtual space, or to map the virtual space to the physical space.

3. The apparatus of claim 2, further comprising a memory, the memory comprising data representing the at least one virtual object.

4. The apparatus of claim 3, wherein the memory comprises data defining a position or an orientation of the at least one virtual object relative to at least one reference point in the virtual space.

5. The apparatus of claim 1, wherein the data processor is further adapted to detect the at least one intersection of the at least one virtual object with a surface of the portion of the body of the user.

6. The apparatus of claim 1, wherein the at least one virtual object is a three-dimensional object in a virtual space.

7. The apparatus of claim 1, wherein the data processor is further adapted to detect at least one of an intersection based on an orientation, a change of the orientation over time, a deformation in time, or a trajectory of the at least one virtual object.

8. The apparatus of claim 1, wherein the at least one virtual object includes a plurality of virtual objects, wherein the data processor is further adapted to detect a plurality of intersections, wherein each intersection is between a virtual object of the plurality of virtual objects and the avatar wearing the digital representation of the wearable item, wherein at least two of the virtual objects of the plurality of virtual objects are located in different locations in the virtual space.

9. The apparatus of claim 8, wherein at least two other virtual objects of the plurality of virtual objects intersect with each other.

10. The apparatus of claim 1, wherein at least one color is assigned to the at least one virtual object, and wherein the data processor is adapted to compute the pattern data based on the at least one color.

11. The apparatus of claim 1, wherein the at least one virtual object comprises a plurality of layers.

12. The apparatus of claim 1, wherein the position detector comprises an infrared (IR) projector and an IR sensor.

13. The apparatus of claim 1, wherein the position detector is adapted to detect a position of at least two different portions of the body of the user.

14. The apparatus of claim 1, further comprising a display device adapted to display an image of the 2D pattern to the user.

15. The apparatus of claim 14, wherein the display device comprises at least one visible light projector adapted to project the image of the 2D pattern onto the body of the user.

16. The apparatus of claim 15, wherein the display device further comprises at least one mirror adapted to reflect a view of the user and the projection of the 2D pattern on the body of the user.

17. The apparatus of claim 1, wherein the data processor is adapted to render the 2D pattern on an avatar.

18. The apparatus of claim 17, wherein a shape of the avatar corresponds to a shape of the body of the user.

19. A computer-implemented method for designing patterns for wearable items, the method comprising:
  detecting a position of at least a portion of a body of a user within a physical space;
  generating a virtual space that represents the physical space, the virtual space including at least one virtual object;
  generating an avatar within the virtual space, the avatar representing the portion of the body of the user;
  generating a digital representation of a wearable item within the virtual space, the digital representation of the wearable item being worn by the avatar, and the wearable item having a shape in the physical space;
  detecting a two-dimensional (2D) pattern created by at least one intersection between the at least one virtual object and a surface of the digital representation of the wearable item, the 2D pattern being formed on the surface of the digital representation of the wearable item at one or more points of the at least one intersection, and the at least one intersection being caused by controlling the avatar wearing the digital representation of the wearable item to intersect with the at least one virtual object, wherein the 2D pattern is modifiable in response to repositioning of the digital representation of the wearable item, and wherein the repositioning of the digital representation of the wearable item is caused by movement of the portion of the user within the physical space;
  generating a 2D image of the digital representation of the wearable item intersecting with the at least one virtual object
  mapping at least one point of the one or more points of the 2D pattern onto one or more portions of the 2D image, the one or more portions of the 2D image corresponding to the 2D pattern fitted onto the shape of the wearable item;
  generating pattern data based on the one or more portions of the 2D image, the pattern data representing the one or more points of the 2D pattern fitted onto the shape of the wearable item; and
  rendering the pattern data to generate a graphic, the graphic being defined customized to the shape of the wearable item worn by the user using the one or more points of the 2D pattern, and the graphic being applied onto the wearable item.

20. The computer-implemented method of claim 19, wherein the at least one virtual object is defined in the virtual space, and wherein the physical space is mapped to the virtual space, or the virtual space is mapped to the physical space.

21. The computer-implemented method of claim 19, wherein the detecting the at least one intersection includes detecting an intersection between the at least one virtual object with a surface of the portion of the body of the user.

22. The computer-implemented method of claim 19, wherein the at least one virtual object is a three-dimensional object in the virtual space.

23. The computer-implemented method of claim 19, wherein the detecting the at least one intersection includes detecting at least one of an intersection based on an orientation, a change of the orientation over time, a deformation in time, or a trajectory of the at least one virtual object.

24. The computer-implemented method of claim 19, wherein the at least one virtual object includes a plurality of virtual objects, wherein a plurality of intersections is detected, wherein each intersection is between a virtual object of the plurality of virtual objects and the portion of the body of the user, wherein at least two of the virtual objects of the plurality of virtual objects are located in different locations in the virtual space.

25. The computer-implemented method of claim 24, wherein at least two other virtual objects of the plurality of virtual objects intersect with each other.

26. The computer-implemented method of claim 19, wherein at least one color is assigned to the at least one virtual object, and wherein the pattern data is computed based on the at least one color.

27. The computer-implemented method of claim 20, wherein the at least one virtual object comprises a plurality of layers.

28. The computer-implemented method of claim 19, wherein a position or an orientation of the at least one virtual object relative to at least one reference point in the virtual space is defined in a memory.

29. The computer-implemented method of claim 19, further comprising rendering the 2D pattern on an avatar of the user.

30. The computer-implemented method of claim 29, wherein a shape of the avatar corresponds to a shape of the body of the user.

* * * * *